Oct. 23, 1923.
J. L. WENTZ
1,471,762
TRUCK
Filed Dec. 22, 1921
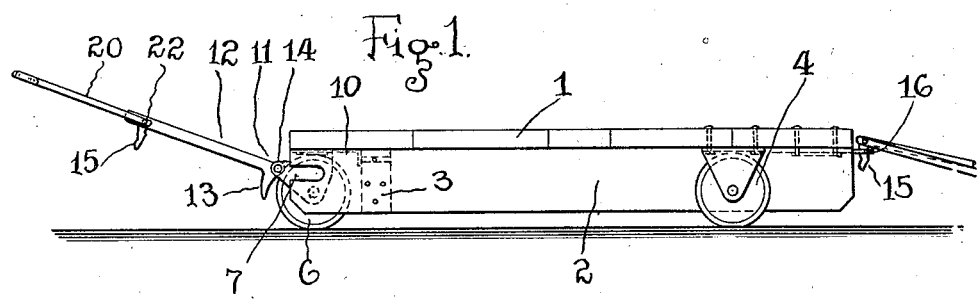
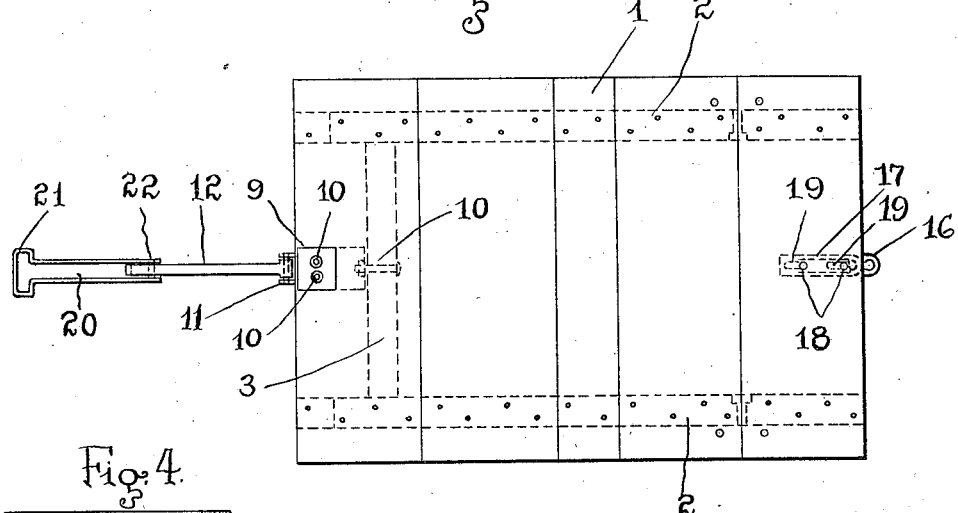
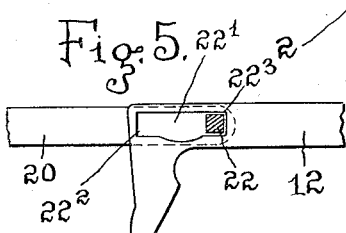
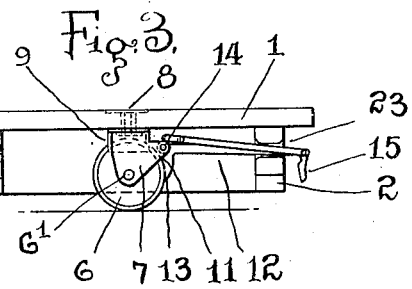
Inventor
Jere L. Wentz
By his Attorney Patented Oct. 23, 1923.

1,471,762

UNITED STATES PATENT OFFICE.

JERE L. WENTZ, OF PASSAIC, NEW JERSEY.

TRUCK.

Application filed December 22, 1921. Serial No. 524,122.

*To all whom it may concern:*

Be it known that I, JERE L. WENTZ, a citizen of the United States, and resident of the city of Passaic, in the county of Passaic and State of New Jersey, have invented certain new and useful Improvements in Trucks, of which the following is a specification.

My invention relates to improvements in trucks and an object of my invention is to provide a simple and convenient truck, another object of my invention is to provide a truck which may be easily and conveniently locked in position, another object of my invention is to provide in a truck a handle which may be readily folded and another object of my invention is to provide a truck which may be readily joined in a train.

I accomplish these objects by the device illustrated in the accompanying drawings in which—

Figure 1 is a side elevation of my improved truck,

Figure 2 is a plan view of the same,

Figure 3 is a front view of the device with the handle folded in locking position, Figure 4 is a plan view of a detail of the handle and hinges, and Figure 5 is a side view of the same.

Similar characters of reference refer to similar parts throughout the several views.

My improved truck includes a platform 1 which may be constructed of planks or of any suitable material, supported on longitudinal stringers 2, 2 with a cross brace 3 between the stringers 2, 2 at or near the front of the truck and to leave clear the space between the stringers 2 at the rear so that optional devices for elevating and otherwise using the platforms, and which are not the subject of this invention, may be run under the platform 1 when desired. Traction wheels 4 are preferably provided at the sides near the rear of the truck with a centrally located traction wheel 6 at the front.

The front wheel 6 serves to direct the course of the truck and for this purpose is mounted on an axle 6' carried in a suitable yoke 7 pivoted on the pin 8 which is seated in the platform 1. I prefer, for greater strength, to provide a box or frame 9 to carry the pin 8 and I secure this box 9 to the platform 1 and to the cross brace 3 by means of suitable bolts 10, 10, 10.

The yoke 7 in which the axle $6^1$ of the wheel 6 is mounted is provided with ears 11 which carry the draft tongue 12.

This tongue 12 is provided with an integral downwardly projecting brake section 13 which normally rests against the periphery of the wheel 6 and serves as a friction brake, the weight of the tongue 12 when unsupported will press the brake section 13 by gravity against the wheel 6 and retard its rotation. When, however, the tongue 12 is raised, as in use, the brake section 13 of the tongue 12 will thereby be elevated out of contact with the wheel 6 and its frictional engagement thereby released, the tongue 12 being pivotally carried by the pin 14 adjacent the brake section 13. The tongue 12 is also provided with a hook 15 adapted to engage another truck or the like when in train formation for which purpose I provide a link 16 at the rear of the platform 1 whereby two or more cars may be linked together to form a train when desired.

This link 16 is preferably slidably mounted on the underside of the platform 1, for which purpose I provide a socket plate 17 on the underside of the platform 1 and secured thereto by means of bolts 18 seated in longitudinal slots 19 in the link 16 whereby the link may be withdrawn substantially under the platform 1 when not in use and may be drawn out for use as required.

The tongue 12 may be provided with an end section 20 having a suitable hold 21 for more convenient use, and the two sections 12 and 20 are joined by means of a pin 22.

I prefer to form this hinge joint between the sections 12 and 20 of the tongue by means of a rectangular pin 22 seated in the section 12 and projecting on each side. The rectangular ends of the pin 22 rest in seats $22^1$ formed in the legs of the section 20. These seats are provided with rectangular end sockets $22^2$ and $22^3$ of such size and shape as to receive and hold the pin 22 and to prevent it from rotating and the central intermediate section of the seat $22^1$ is sufficiently large to permit the pin 22 to turn freely therein.

It will thus be apparent that the draught upon the tongue in either a forward or reverse direction will seat the pin 22 in the rectangular sockets $22^2$ or $22^3$ at the front or rear of the seat $22^1$ whereby the tongue sections will be held rigid but that the seat $22^1$ will turn freely on the pin 22 when the pin is in the enlarged central section of the seat 22¹ and the two sections 12 and 20 of the tongue may thus be folded together.

In the front faces of the stringers 2 I provide sockets 23 to receive the tongue 12 when not in use as is hereafter more particularly explained.

My device being thus assembled, the wheel 6 will be normally held in position by the frictional engagement of the brake section 13 which is pressed against the wheel 6 by the weight of the tongue 12 and when not in use the wheel may be turned on the pin 8 to a position at right angles to the wheels 4 and the tongue folded and set in the seat 23 in the stringer 2 which seat is preferably so positioned as to require additional pressure to spring it into the seat.

In this position the device will be effectively locked against forward movement by the position of the wheel 6 and against lateral or sidewise movement by the pressure of the brake section 13 on the wheel 6.

When it is desired to use the truck the tongue is taken from the seat 23 and straightened out and raised to a convenient position whereby the wheel 6 will be released from frictional engagement with the brake section 13 and the truck may then be drawn about as desired, and two or more trucks may be linked together in a train as above explained by means of the link 16 and engaging hook 15.

Having thus described my invention, what I claim is:

1. In a device of the character described, the combination of a truck, traction wheels thereon, a tongue secured to the truck and having a brake section adapted to normally engage a traction wheel and a seat in the truck to receive the tongue and to hold the same in frictional engagement with the wheel.

2. In a device of the character described, the combination of a truck, a traction wheel thereon, a draft tongue on the truck having a brake section adapted to normally engage the traction wheel and a hook section on the tongue adapted to link the truck in train formation and to hold the brake section in an inoperative position.

3. In a device of the character described the combination of a truck including a platform, supporting stringers at the longitudinal sides, a cross brace between the stringers at one end, a yoke pivoted on the underside of the platform and secured to the cross brace, a folding draft tongue carried by the yoke, a traction wheel on the yoke, a brake section on the tongue adapted to frictionally engage the traction wheel, a hook section on the tongue adapted to link the truck in train formation and a seat in the stringer adapted to receive and hold the tongue.

4. In a truck, the combination of traction wheels, a draft tongue having an integral brake section adapted to engage a traction wheel of the truck and a hook section intermediate the ends of the draft tongue adapted to hold the brake section in an inoperative position.

5. The combination of a truck, a link thereon adapted to provide for train formation, a draft tongue having a brake section adapted to engage a traction wheel and a hook section adapted to engage a link for train formation and to hold the brake in an inoperative position.

6. A draft tongue having a forward section and a back section, the forward section being adapted to fold to avoid an obstruction, a brake element on the back section and a hook carried by the tongue adapted to secure the brake in an inoperative position and to connect an attached truck in train formation.

7. A sectional draft tongue, a brake element thereon and a hook on the tongue adapted to secure the brake in an inoperative position and to connect an attached truck in train formation.

Signed at Passaic, in the county of Passaic and State of New Jersey this 15th day of December A. D. 1921.

JERE L. WENTZ.